Figure 1:
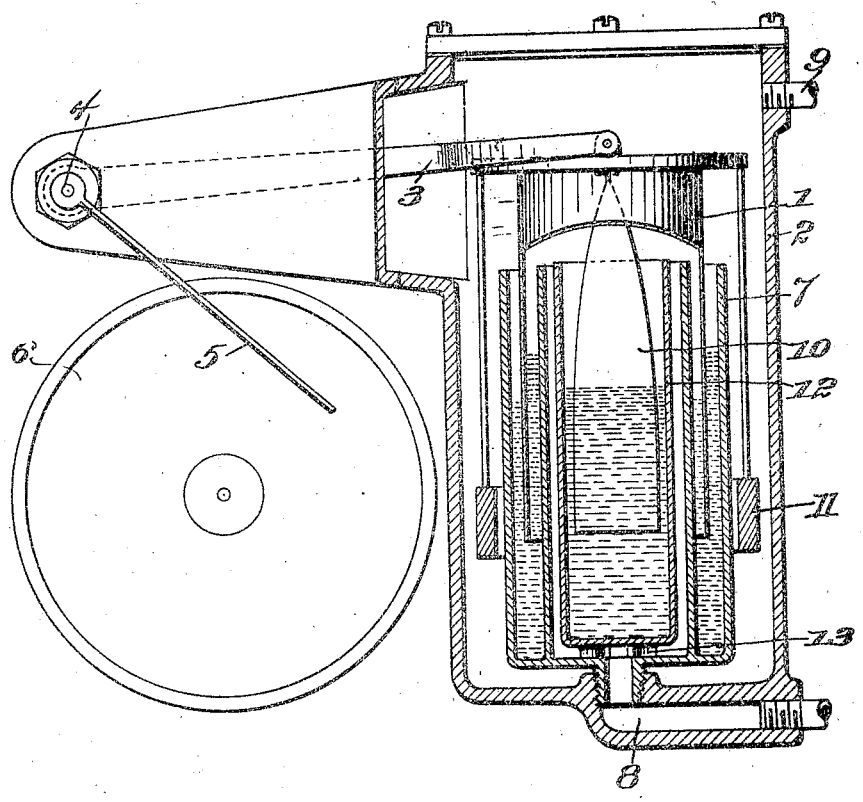

E. G. BAILEY.
PRESSURE GAGE.
APPLICATION FILED JUNE 2, 1913.

1,123,163.

Patented Dec. 29, 1914
2 SHEETS—SHEET 1.

Witnesses:

Inventor:
Ervin G. Bailey,
by Livermore, Atty

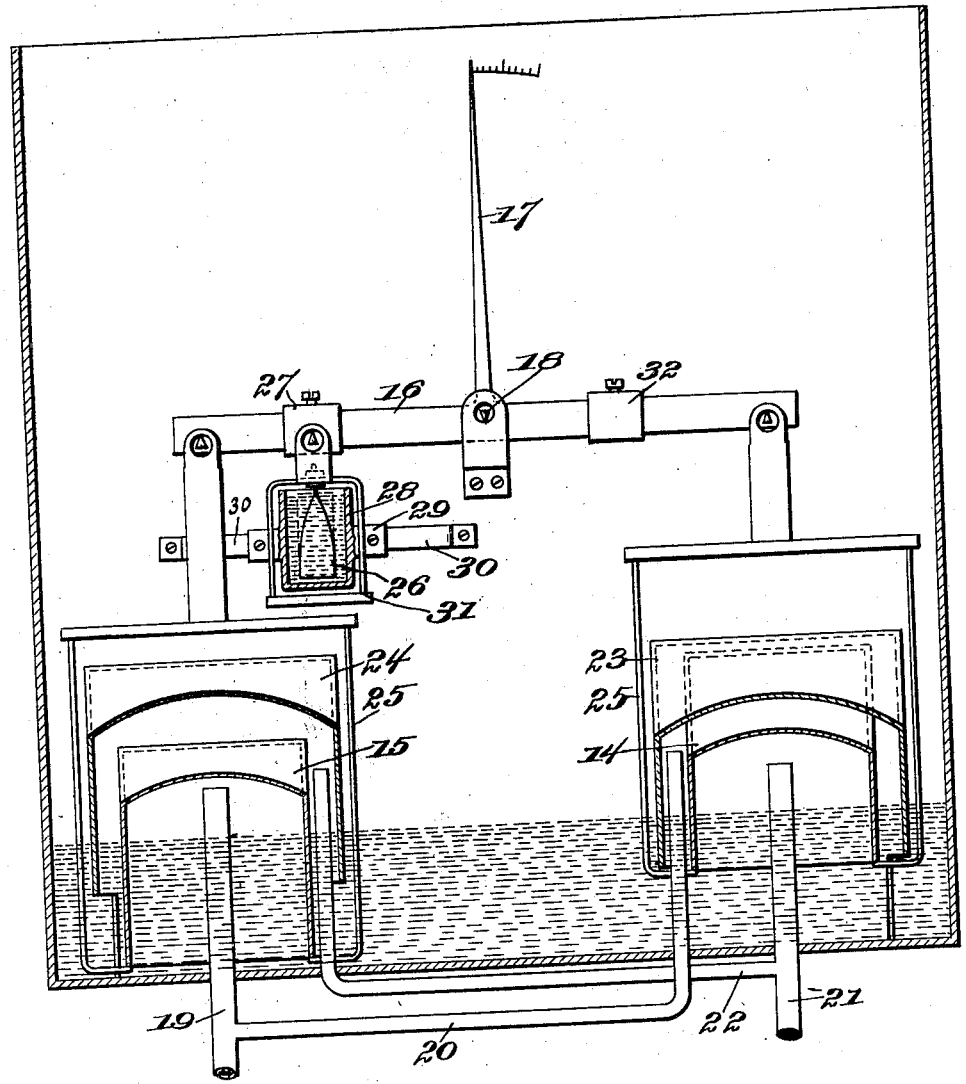

UNITED STATES PATENT OFFICE.

ERVIN G. BAILEY, OF NEWTON HIGHLANDS, MASSACHUSETTS.

PRESSURE-GAGE.

1,123,163.   Specification of Letters Patent.   Patented Dec. 29, 1914.

Application filed June 2, 1913. Serial No. 771,146.

*To all whom it may concern:*

Be it known that I, ERVIN G. BAILEY, a citizen of the United States, residing in Newton Highlands, in the county of Middlesex and State of Massachusetts, have invented an Improvement in Pressure-Gages, of which the following description, in connection with the accompanying drawings, is a specification, like letters on the drawings representing like parts.

The present invention relates to a pressure gage, and is embodied in an instrument of that class by means of which variations in pressures or pressure differences are indicated or recorded by a movable indicating member in conjunction with a scale or chart.

The purpose of the invention is to arrange the instrument in such a way that it will operate accurately in cases where very light pressures are encountered, the arrangement being such that friction is almost entirely eliminated, while the parts are always maintained in stable equilibrium without the use of guides or analogous devices, which cause inaccuracies due to friction.

A further feature of the invention consists in an arrangement whereby the reading of the instrument can be caused to vary as some function of the pressures or pressure difference, instead of varying as the simple ratio thereof, and also whereby the reading can, by a suitable adjustment, be magnified as desired for any given pressures or pressure differences.

In accordance with the invention, the pressures under observation are exerted on opposite sides of a sealed bell or bells shown as connected with an oscillating beam, and the force due to pressure acting on the bells is measurably counteracted by a displacing member also movable with the beam and bell and extending into a liquid, the change in buoyancy of the said displacing member, as the beam is moved by the bell, finally bringing the several forces acting on the beam to a state of equilibrium, and determining the position of the indicating member which shows the reading desired.

In making and using the instrument, I prefer to use mercury as the liquid and to make the displacing member of iron or steel; and in this case it is necessary to add a weight to the displacing member and outside of the mercury or buoyant liquid in order to keep the displacing member submerged beyond its normal floating depth. This weight is so connected to and so proportioned with relation to the displacing member as to cause the center of gravity of the displacing member and connected parts to be so positioned with respect to the shape of the displacing member, and to the center of buoyancy or support thereof, that stable equilibrium of flotation will exist; and the associated parts, therefore, will have no tendency to tip from their normal vertical position, as they rise or fall. I have also shown the instrument as so arranged and the pressures applied to the instrument in such a way that the preponderating pressure tends to move the displacing member out from the liquid, the result being that the parts always remain in stable equilibrium, so that no guides or equivalent devices are required to hold the displacing member in its operative position.

Figure 1 is a vertical section, partly in elevation, of an instrument embodying the invention, and Fig. 2 is a similar view showing a modification thereof.

Referring to Fig. 1, the pressure receiving bell 1 is within a pressure-tight chamber 2, and is connected with an oscillating beam or lever 3 which has a pivot bearing 4 consisting of a spindle extending through suitable pressure-tight bearings to the outside of the casing where it is provided with an indicating arm 5 shown as a pen adapted to travel over the surface of a rotatable chart 6. The bell 1 extends into an annular receptacle 7 which is adapted to contain a liquid sealing the mouth of the bell; and pressure is admitted to the interior of the bell above the sealing liquid through the inlet 8 which extends through the bottom of the receptacle 7 to the space within the inner wall thereof. The other pressure under observation is admitted to the chamber 2 through a pipe 9, so that any change in the difference between the pressures tends to cause a movement of the bell 1, in one direction or the other and a consequent movement of the arm 3 and indicator 5. In using the instrument, when constructed as herein shown, the preponderating pressure is exerted on the interior of the bell, so that the tendency of the bell is to move upward as the pressure difference increases. For the purpose of bringing about a state of equilibrium when the indicator 5 is in such position as to indicate in desired terms or functions the difference of pressure, a displacing member 10 is employed, the said displacing member being movable with the beam 3 and extending into a liquid, so that the buoyant effect of the liquid on the displacing member changes as the beam moves, and, finally restores equilibrium.

In the construction shown in Fig. 1, the displacing member 10 is located inside of the bell 1, and the liquid in which said displacing member extends is contained in a receptacle 12 which is concentric with the receptacle 7 which contains the sealing liquid for the bell. The weight 11 is connected with the displacing member 10 so as to cause the proper submersion of said displacing member for the zero position, and is so located that the center of gravity of the displacing member and its attached parts is low with respect to the center of buoyancy or support so that all the moving parts remain in stable equilibrium of flotation at all times. The receptacle 12 is shown as mounted on ribs 13 at the bottom of the chamber 7, so as to afford a space for the fluid pressure entering through the inlet 8 to communicate with the interior of the bell 1. In the construction shown, the instrument is adapted to show a reading which varies as some function of the pressure difference, such as the functional relation between velocity head and rate of flow of fluids, and this is accomplished by shaping the displacing member 10, so that its horizontal cross-sectional area progressively varies, thereby modifying the change in buoyancy due to the movement of the displacing member with relation to the liquid. It is obvious, however, that if the instrument is to indicate a reading that varies in direct ratio to the pressure difference, the displacing member can be made of uniform cross-sectional area throughout, as indicated in dotted lines, Fig. 2.

The instrument illustrated in Fig. 2 is especially designed for use where very slight pressures are encountered, and in this instrument I employ two sealed bells 14 and 15 suspended from a beam 16 which carries the indicator 17, the said beam being pivoted at 18, while the bells are pivotally supported at opposite sides of the said pivot. In this case the preponderating pressure is admitted through a pipe 19 to the interior of the bell 15, the same pressure being conveyed through a pipe 20 to the outside of the bell 14, so that the combined area of the two bells is subjected to pressure. Similarly the lesser pressure is admitted through the pipe 21 and branch 22 to the inside of the bell 14, and the outside of the bell 15. Both of the bells are shown as sealed in liquid contained in a main receptacle or chamber, the pressure at the outside of the bells being confined by hoods 23 and 24 which are sealed in the liquid, but open below the surface of the liquid to receive the yokes 25 which support the bells. In this case, the displacing member 26 is suspended from the beam 16 at one side of the axis thereof, and is shown as mounted on a block 27 adjustable along the said beam with relation to the axis thereof. The liquid into which the displacing member 26 extends is contained in a receptacle 28 which is shown as held by a sliding bracket 29, on a guide 30, so that the said receptacle can be adjusted in position to correspond to the adjustment of the displacing member 26.

When the liquid contained in the receptacle 28 is of greater density than the density of the displacing member 26, an additional weight, such as the weight 31, may be employed to cause the desired submersion of the displacing member. This weight is shown as supported below the reservoir 28, being connected to the displacing member by a yoke, so that the center of gravity of the displacing member and the parts connected therewith are sufficiently low with relation to the center of buoyancy or support, to maintain a state of stable equilibrium throughout the range of operation. The function of the weight 31 is the same as that of the weight 11 previously described; but in the instrument shown in Fig. 2, this weight may be dispensed with if the liquid used is of less density than that of the displacing member. A perfect balance of the parts is brought about by means of an adjustable weight 32 at the opposite side of the pivot 18 so that the pointer 17 will stand at the zero mark on the scale when no pressures are applied to the instrument. It is obvious in this construction that the motion due to the force exerted by the pressures is transmitted through a moment arm to the indicator, so that by adjusting the said moment arm to vary the moments of force required to bring about a state of equilibrium, the movement of the indicator along the scale can be varied per unit of pressure difference, so that the instrument can be adjusted for various conditions without changing the sizes of the bells or displacing member or the graduations of the scale with relation to the pointer. In this instrument, this adjustment can conveniently be made by moving the displacing member 26 and its liquid receptacle 28 with relation to the pivot 18, and correspondingly adjusting the movable weight 32 to bring about a perfect balance of the parts when the pointer is at zero.

What I claim is:

1. In a pressure gage, the combination with a bell sealed in a liquid and subjected to opposed pressures outside and inside; of an oscillatable beam to which said bell is connected; a displacing member also connected with said beam, and extending into a liquid; and means for adjusting the length of the moment arm through which the pressures act to cause the movement of the displacing member.

2. In a pressure gage the combination with a pressure receiving bell sealed in a liquid; of an oscillatable beam to which said bell is connected; a displacing member connected with said beam and extending into a liquid of greater density than that of the displacing member; and a weight connected with said displacing member and being outside of the liquid, the center of gravity of said weight being below the center of gravity of said displacing member.

3. In a pressure gage, the combination with a pressure receiving bell sealed in a liquid, of an indicator; means for connecting said indicator with said bell; a displacing member connected with said indicator and extending into a liquid; and a weight associated with said displacing member and so located with relation thereto that the center of gravity of the displacing member and weight is always below the center of buoyancy or support of the displacing member.

In testimony whereof, I have signed my name to this specification in the presence of two subscribing witnesses.

ERVIN G. BAILEY.

Witnesses:
  JAS. J. MALONEY,
  M. E. COVENLY.